Dec. 9, 1969  TSIH CHANG WANG ET AL  3,483,403
MAGNETOHYDRODYNAMIC GENERATION OF ELECTRICITY
Filed Nov. 4, 1965

INVENTORS
TSIH-CHANG WANG
ABDEL-AZIZ A. FOUAD
KARLHEINZ E. WOEHLER
BY Donald J. Ellingsberg

United States Patent Office 3,483,403
Patented Dec. 9, 1969

3,483,403
MAGNETOHYDRODYNAMIC GENERATION OF ELECTRICITY
Tsih Chang Wang, Canoga Park, Calif., Abdel-Aziz A. Fouad, Ames, Iowa, and Karlheinz Edgar Woehler, Carmel, Calif., assignors to North American Rockwell Corporation
Filed Nov. 4, 1965, Ser. No. 506,311
Int. Cl. H02n 4/02
U.S. Cl. 310—11                        11 Claims

ABSTRACT OF THE DISCLOSURE

A method of and apparatus for generating alternating current in a magnetohydrodynamic (MHD) generator by successively forming liquid rich slugs in working fluid, magnetically treating the individual slugs and inductively removing the energy therefrom.

Background of the invention

Conventional MHD generators generate direct electrical current by converting the kinetic energy of an electrically conductive working fluid into electrical energy by moving the working fluid through a primary or applied magnetic field that is set up across the MHD generator. The interaction of the moving fluid and the primary magnetic field induces an electrical field with a direct current flow in a direction that is mutually perpendicular to both the direction of fluid motion and the magnetic field. The direct current flow is collected by suitable electrodes spaced apart within the MHD generator and electrically connected to an external load in a conventional manner.

There are several disadvantages to the conventional direct current MHD generators. Direct current, with the exception of a few industrial applications, is not useful for most commercial and industrial applications where the desirable form of electrical energy is an alternating electrical current. Inverter equipment is therefore needed with direct current MHD generators to convert the direct current to alternating current. Inverter equipment is complex and expensive so that the cost per kilowatt hour is substantially increased. Additionally, inverters introduce a power loss during conversion.

Another problem that exists in a direct current MHD generator is that the direct current is collected by electrodes within the MHD generator which are exposed to the working fluid stream passing therethrough. This contact with the working fluid present a severe materials problem since the working fluid rapidly erodes the electrodes. Frequent replacement of the electrodes is therefore necessary. In addition, the positive electrode must be at an operating temperature where it will be a good electron emitter. However, the electrodes cannot be conveniently cooled in a direct current MHD generator because a low temperature region near the electrodes would introduce a high electrical resistivity with a corresponding high power loss.

These problems with direct current MHD power generation led to the development of MHD generators which generate alternating current. The alternating current MHD generators known in the prior art do not require inverter equipment and eliminate electrodes by using inductive coupling. The principle of operation of these alternating current or induction MHD generators is essentially the same as that of well-known rotating induction machinery. That is, an alternating magnetic field is set up by the stator winding currents and made to rotate at a predetermined speed. When the conductors of another winding (usually the rotor) move at a different speed, electrical currents will be induced in these windings.

The induction MHD generator is analagous to conventional rotating induction machines. Conventional alternating current MHD generators replace the primary magnetic field of a direct current MHD generator with a series of field windings which are sequentially energized from a separate power supply to set up a magnetic field that moves as a travelling wave in the direction of fluid flow. The travelling wave set up by the sequentially energized field windings develops circulating electrical currents in the moving working fluid. The interaction of these circulating currents with the stator windings through inductive coupling converts the kinetic energy of the working fluid into electrical power when the velocity of the working fluid is greater than that of the travelling magnetic field. This difference between the working fluid velocity and the velocity of the travelling magnetic field is known as slip; the slip should be constant for the efficient generation of power.

It is generally assumed that the working fluid velocity along the MHD generator is constant; however, this approximation is not valid for liquid metal MHD generators. In actual practice, the working fluid velocity gradually decreases as it flows along the MHD generator. If the externally developed travelling magnetic field moves at a constant speed, the MHD generator experiences a variable slip from entrance to exit. Controlling the sequential energization of the field windings in conventional induction MHD generators is therefore critical since a variable slip along the length of the generator will decrease the efficiency of the generator.

Further, the sequentially energized field windings require both complex and costly external power supply systems. Thus, the conventional induction MHD generator cannot be self-excited.

Objects of the invention

Accordingly, it is an object of this invention to provide a new and improved method of and apparatus for generating an alternating electrical current from a MHD generator.

Another object of the invention is to provide a method and apparatus for generating alternating current from a MHD generator without sequential energization of stator windings to set up a travelling magnetic field.

A further object of this invention is to provide a MHD generator in which the electrical power output of the generator is independent of slip.

Still another object is to provide a MHD generator that eliminates complex and costly external power supply systems.

Yet another object of the invention is to provide a method of and apparatus for generating an alternating current from a MHD generator without significantly altering the steady-flow characteristics of a working fluid.

Another object is to provide a MHD generator that may be self-excited.

Summary of the invention

Briefly, in accordance with this invention, a new and improved method of and apparatus for generating alternating current is provided wherein electrically conductive slugs are periodically formed in an electrically nonconductive working fluid and each slug is impressed with a predetermined liquid magnet dipole characteristic by an excitation means so that periodic ones of the slugs have like polarity. A predetermined spacing of the electrically conductive slugs in the working fluid induces an alternating electrical current in a stator winding region.

Further objects, features, and the attending advantages of the invention will become readily apparent when the following description is read in view of the accompanying drawings.

Description of the invention

Figure 1:
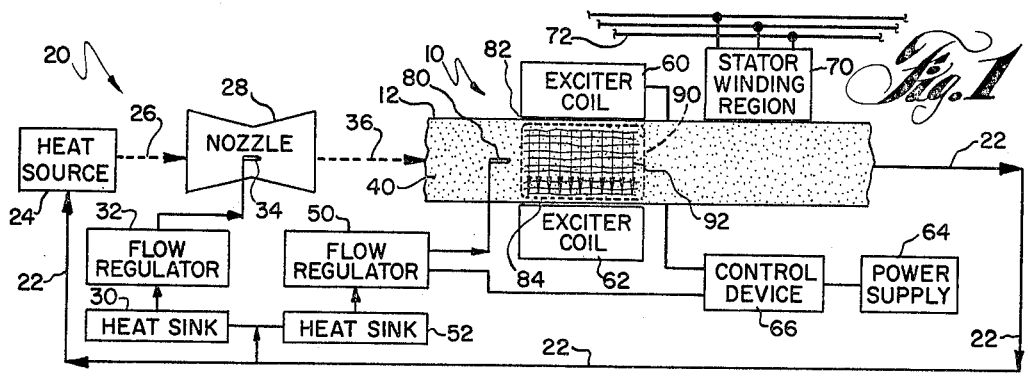
FIGURE 1 is a schematic of one form of a new and improved MHD generator formed in accordance with the present invention and connected into a magnetohydrodynamic energy conversion system.

Referring to FIGURE 1, one form of MHD generator 10 has a suitable conduit 12 connected to a magnetohydrodynamic system 20 which is similar to that described in application S.N. 506,311 and S.N. 506,324, both filed Nov. 4, 1965, and U.S. Patent No. 3,320,444, issued May 16, 1967, all assigned to the same assignee as the present invention.

Conduit 22 of the magnetohydrodynamic system 20 introduces a working fluid containing one or more components, at least one of which is vaporizable, into a suitable and conventional heat source 24. The working fluid is raised to a temperature equal to or higher than the vaporization temperature thereof by the heat source 24 so that the working fluid is partially vaporized and, in the system as shown, becomes a two-phase mixture, i.e. having both vapor and liquid phases. The two-phase working fluid passes as a vapor-rich mixture, as schematically shown by dashed line 26, to a nozzle means 28 which increases the kinetic energy of the working fluid. The vapor phase entering the nozzle means 28 can be either wet, saturated, or superheated. The nozzle means 28 converts the thermal energy of the partially vaporized working fluid into kinetic energy so that a high velocity, working fluid stream results.

In the preferred magnetohydrodynamic system 20 as shown, a liquid portion of the working fluid passing through conduit 22 to the heat source 24 is fed to a conventional heat sink 30 which subcools the liquid. A separate source of liquid is also contemplated. The subcooled liquid is conducted through a pressure or flow regulator 32 and injected into the nozzle means 28 at point 34. The injection of subcooled liquid is controlled by the regulator 32 so that the resulting working fluid passing from the nozzle means 28 has been adjusted and is vapor rich; for example, approximately 70% vapor as schematically shown by dashed line 36. A vapor-rich fluid is a relatively inferior or poor electrical conductor since the molecules of the liquid phase are widely separated by the vapor phase. In a liquid-rich fluid, the molecules of the liquid phase are compact and the fluid is, therefore, a relatively superior or good electrical conductor. The vapor-rich working fluid passing from nozzle means 28 is a relatively inferior electrical conductor as schematically indicated at 40.

The electrical characteristics of the working fluid 40 passing to the MHD generator 10 of this invention, however, must be altered from the relatively inferior electrical conductor (vapor-rich fluid) to a relatively superior electrical conductor (liquid-rich fluid) since the MHD generator must "see" an electrically conductive working fluid to generate electrical power. Therefore, electrical conductivity of the working fluid is altered by the controlled injection of liquid, again preferably subcooled, into the stream of vapor-rich working fluid 40. A flow or pressure regulator 50 injects a predetermined quantity of liquid that passes from conduit 22 through a conventional heat sink 52. Heat sink 52 is optional and can be eliminated where the magnetohydrodynamic system parameters do not require this additional heat exchange capacity. It is contemplated that each flow regulator 32 and 50 could receive liquid from a common heat sink.

In the form of MHD generator 10 as shown by FIGURE 1, exciter means, such as exciter coils 60 and 62, are spaced adjacent conduit 12. It is contemplated that a single exciter coil can also be used. Exciter coils 60 and 62 are supplied with direct current from a suitable power supply 64 through a conventional control means, such as control device 66, which preferably includes a conventional timer and switching device. The exciter coils 60 and 62 are suitably energized by the control device 66 to set up a uniform, non-reversing magnetic field across conduit 12. Since the working fluid 40 passing through conduit 12 has been adjusted, as previously described, to be a relatively inferior conductor, the resistivity of the working fluid is low. Therefore, a magnetic field set up by the exciter coils will readily penetrate through the working fluid and across the conduit.

A stator winding means, such as the polyphase stator winding region 70, is positioned adjacent the conduit 12 and is electrically connected in a conventional manner to a power line, such as polyphase power line 72. The stator winding 70 is similar to the polyphase stator winding of a conventional induction motor. A single phase stator winding region is also contemplated.

Control device 66 actuates flow regulator 50 which injects liquids from heat sink 52 into the working fluid 40 generally at point 80. The injection point 80 is adjacent the entrance region 82 of the excitation region 84 defined by the exciter coils 60 and 62. The injection of liquid at point 80 is preferably in a direction that is parallel to the flow direction of the working fluid. However, injection in the opposite direction or at an angle to the flow direction is also contemplated. Multiple injections at or near the entrance region 82 can also be used.

The controlled injection of liquid at 80 increases the liquid percent of the total volume of the working fluid 40 and decreases the vapor percent volume so that the resulting working fluid becomes liquid-rich and, therefore, becomes a relatively superior electrical conductor as the fluid passes through the excitation region 84. The injection of liquid is controlled to match the system parameters such as working fluid velocity, thermal characteristics, type of working fluid, or the like.

Figure 2:
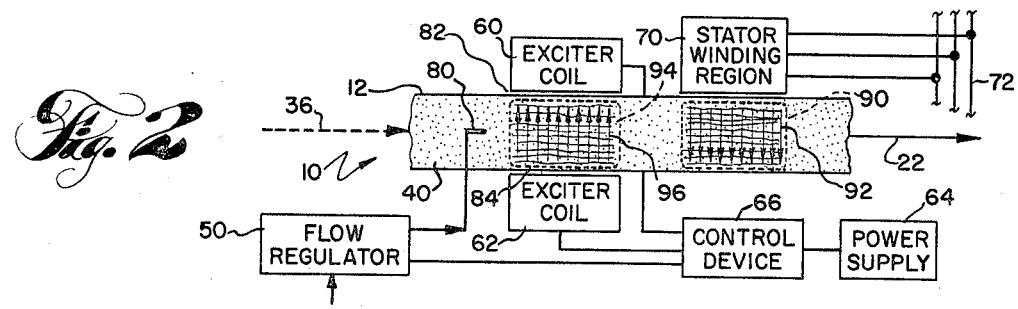
FIGURE 2 is a schematic, partially shown, of the MHD generator shown by FIGURE 1.
Figure 3:
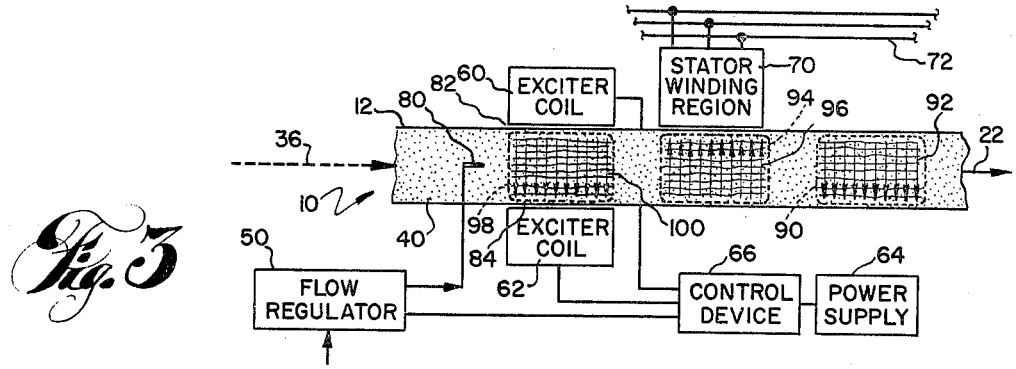
FIGURE 3 is another schematic, partially shown, of the MHD generator shown by FIGURE 1.

The principle of operation of the MHD generator 10 as shown by FIGURE 1 can best be understood by referring to FIGURES 1, 2, and 3 in sequence. In FIGURE 1, control device 66 energizes exciter coil 60 in the embodiment as shown, or both exciter coils 60 and 62 when properly wound, so that a non-reversing magnetic field is set up across conduit 12 through the working fluid 40 within excitation region 84. Control device 66, after a predetermined period, actuates flow regulator 50 to initiate a controlled injection of a predetermined volume of liquid into the working fluid stream at point 80. The controlled injection of liquid at 80 increases the liquid percent of the total volume of the working fluid and decreases the vapor percent volume so that the resulting working fluid becomes liquid rich. The working fluid is, therefore, a relatively superior electrical conductor as it passes through the excitation region 84.

The injection of liquid at 80 for a predetermined period of time develops a liquid-rich "slug" that is a relatively superior electrical conductor. The general boundary of this slug is indicated by dashed line 90. The transverse magnetic flux field set up across the conduit 12 by exciter coil 60 prior to the forming of slug 90 is impressed within the slug as generally indicated by the flux arrows 92. The slug 90 is therefore polarized and exhibits a liquid magnet dipole characteristic which is schematically represented by the flux arrows 92. The heads of the arrows are arbitrarily designated as the north magnetic pole region of the slug.

It is known in the art that where the magnetic Reynolds number is greater than unity, a transverse magnetic field will move with the working fluid stream and exhibit a minimum of magnetic flux leakage. It is also known that the magnetic Reynolds number is greater than unity when the working fluid is a liquid metal such as potassium or the like. Therefore, slug 90 is a liquid magnetic dipole which has the transverse magnetic field "frozen," i.e. a minimum of magnetic flux leakage, therein.

The injection of liquid at point 80 constitutes a relatively insignificant change in the weight percent liquid. The controlled injections which are necessary to alter the electrical characteristics of the working fluid from an inferior electrical conductor to a superior electrical conductor can result in a minimum of 0.33 weight percent change. This small weight change does not adversely affect the steady flow characteristics of the working fluid and, therefore, does not introduce an undesirable pressure drop across the MHD generator 10.

Referring now to FIGURE 2, slug 90 has moved downstream from the excitation region 84. As slug 90 moved from the excitation region 84, control device 66 de-energized excited coil 60 so that the transverse magnetic field collapsed. This interruption of the transverse magnetic field permits the liquid magnet dipole or slug 90 to move freely from the excitation region 84. If the transverse magnetic field were maintained, a solenoid effect would act upon slug 90 and pull the slug back into the excitation region 84 against the working fluid flow. Since the transverse magnetic field has collapsed, slug 90 can move freely downstream toward the stator region 70.

Control device 66 next energizes exciter coil 62 to set up a transverse magnetic field across the conduit 12 in the opposite direction from that previously established by the exciter coil 60. The interruption of the controlled injection of liquid at 80 and the subsequent return of the working fluid to a relatively inferior electrical conductor, as shown at 40, facilitates the establishment of the transverse magnetic field by exciter coil 62.

Control device 66, after a predetermined period of time, actuates flow regulator 50 to begin another controlled injection of liquid at 80. The controlled injection forms slug 94 in a manner similar to that previously described for slug 90. Slugs 90 and 94 are preferably spaced apart as determined by the timed injection of liquid at 80. Each period of liquid injection at 80 is controlled to match the magnetohydrodynamic system parameters so that the periods of liquid injection correspond to a desired electrical frequency.

The transverse magnetic field set up across the conduit by exciter coil 62 is impressed within slug 94 as generally shown by flux arrows 96. Here, as in FIGURE 1, the heads of the flux arrows 96 define a north magnetic pole region. Thus it can be seen from FIGURE 2, that slugs 90 and 94 have alternate dipole characteristics.

Referring now to FIGURE 3, slugs 90 and 94 have moved downstream from the positions as shown by FIGURE 2. Slug 98 has been formed in the excitation region 84 in a manner similar to that previously described for the formation of slug 90 as shown by FIGURE 1. Again, magnetic flux arrows 100 are impressed within slug 98 by a previously established transverse magnetic field set up across the conduit 12 by the energization of exciter coil 60. The series of liquid magnetic dipoles or frozen slugs 90, 94, and 98 are spaced apart in the steady-flow, working fluid passing through conduit 12. The slugs 90, 94, and 98 are of substantially equal magnetic strength with opposite polarity as indicated by the respective magnetic flux arrows 92, 96, and 100 so that alternate ones of the slugs, i.e. slugs 90 and 98, have like magnetic polarity. It is contemplated that periodic ones of the slugs could have like magnetic polarity; for example, two slugs in the series could have a magnetic polarity opposite to that of the next two slugs in the series. The passage of the slugs 90, 94, and 98 through the stator region 70 induces an alternating current in the conventional polyphase stator windings with a predetermined frequency.

Figure 4:
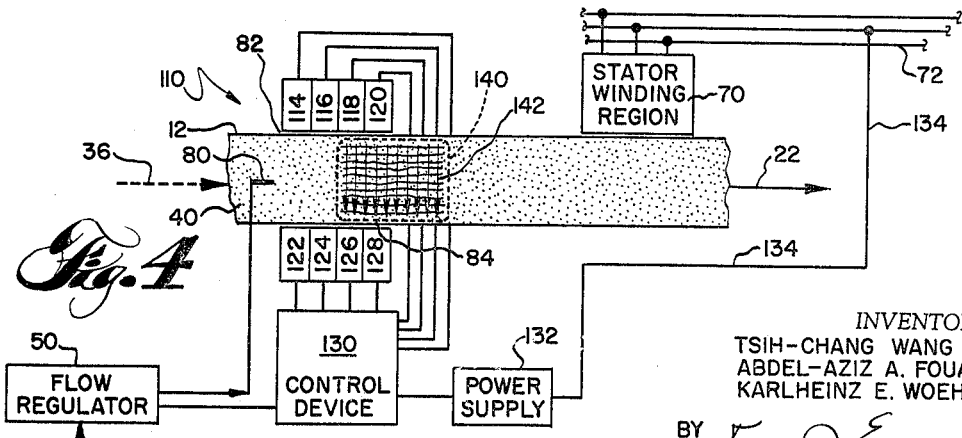
FIGURE 4 is a schematic of another form of MHD generator formed in accordance with the present invention.

Referring now to FIGURE 4, another form of MHD generator 110 is shown connected to a magnetohydrodynamic system such as that previously described and shown by FIGURE 1. Like reference numerals will herein refer to like parts.

A plurality of exciter coils 114, 116, 118, and 120, as a first set, and 122, 124, 126, and 128, as a second set, are suitably connected to a conventional control device 130 for sequential energization. Direct current is supplied through control device 130 to each of the exciter coils in a predetermined sequence from a suitable power supply 132. Power supply 132 can receive electrical power from power line 72 through line 134 so that the MHD generator 110 is self-excited, or the power supply 132 can be a separate source of power such as a battery or generator so that the MHD generator is separately excited.

Operatively, coils 114, 116, 118, and 120 are energized by the control device 130 to set up a transverse magnetic field across conduit 12. A liquid magnet dipole or slug 140 is formed within the steady-flow, working fluid by the controlled injection of liquid at point 80 in a manner similar to that previously described and shown by FIGURE 1. After a predetermined period, the injection of liquid at 80 is interrupted and slug 140 passes downstream from the excitation region 84 with dipole characteristics impressed within the slug as indicated by the magnetic flux arrows 142. As slug 140 moves downstream, the exciter coils 114, 116, 118, and 120 are sequentially de-energized by the control device 130. For example, coils 114 and 116 will be de-energized while coils 118 and 120 will remain energized and continue to impress the desired dipole characteristics through the slug.

Exciter coils 122, 124, 126, and 128 are sequentially energized by control device 132 as coils 114, 116, 118, and 120 are sequentially de-energized. For example, coils 122 and 124 are sequentially energized as coils 114 and 116 are sequentially de-energized. The sequential energization of coils 122 and 124 preferably sets up a transverse magnetic field in the opposite direction across the conduit 12 and through the working fluid which is again a relatively inferior electrical conductor since the injection of liquid at 80 has been interrupted. As slug 140 continues to move downstream toward and into the stator winding region 70, exciter coils 118 and 120 are sequentially de-energized and coils 126 and 128 are sequentially energized. When the next injection of liquid at 80 begins, a transverse, magnetic field of opposite polarity has been set up across the conduit by exciter coils 122, 124, 126, and 128.

The MHD generator 110 as shown by FIGURE 4 substantially minimizes or eliminates the undesirable solenoid effect on the slugs, such as slug 140, and substantially increases the frequency of slug formation so that the interval between slugs can be reduced.

As will be evidenced from the foregoing description, certain aspects of our invention are not limited to the particular details of construction as illustrated, and it is contemplated that other modifications and applications other than those described herein will occur to those skilled in the art. It is, therefore, intended that the appended claims shall cover such modifications and applications that do not depart from the true spirit and scope of the invention.

What is claimed is:

1. A method of generating alternating electrical current comprising:
    (a) forming slugs of substantially electrically conductive fluid in a substantially electrically non-conductive steady-flow working fluid,
    (b) impressing on each of said slugs a predetermined magnetic dipole characteristic frozen in each of said slugs so that periodic ones of said slugs have like magnetic polarity, and
    (c) extracting alternating electrical current from said spaced-apart dipole slugs.

2. A method of generating alternating electrical current comprising:

(a) passing a substantially electrically non-conductive working fluid through a stator winding region,
(b) forming a series of substantially electrically conductive slugs in said non-conductive working fluid,
(c) spacing said slugs at a predetermined interval in said working fluid,
(d) impressing on selected ones of said slugs a predetermined magnetic dipole characteristic frozen in each of said slugs so that periodic ones of said slugs have like magnetic polarity, and
(e) extracting alternating electrical current from said spaced-apart dipole slugs in the stator winding region.

3. The method of claim 2 in which like magnetic polarity is impressed on alternate ones of said electrically conductive slugs.

4. The method of claim 2 in which said series of slugs is formed by periodically injecting a predetermined volume of liquid into said working fluid.

5. An improved alternating current magneto hydrodynamic generator system comprising:
(a) a source of substantially electrically non-conductive working fluid,
(b) a stator winding means in fluid communication with said source of working fluid,
(c) exciter means suitably positioned between said source of working fluid and said stator winding means to selectively impress a predetermined dipole characteristic substantially through said working fluid,
(d) injection means suitably positioned between said source of working fluid and said exciter means to selectively inject a predetermined volume of liquid into said working fluid,
(e) each of said liquid injections forming a substantially electrically conductive slug in said working fluid, and
(f) control means sequentially actuating said exciter means and said injection means,
(g) said sequential actuation forming a series of spaced-apart, electrically conductive slugs, periodic ones of said slugs having like magnetic polarity, so that passage of said slugs through said stator winding means generates an alternating electrical current.

6. The system of claim 5 in which alternate ones of said spaced-apart, electrically conductive slugs have like magnetic polarity.

7. The system of claim 5 in which said stator winding means has a polyphase stator winding.

8. The system of claim 5 in which said exciter means includes at least one exciter coil winding.

9. The system of claim 8 in which said exciter coil winding is self-excited.

10. The system of claim 5 in which said exciter means includes a plurality of exciter coil windings.

11. The system of claim 10 in which said plurality of exciter coil windings are sequentially energized and de-energized.

References Cited

UNITED STATES PATENTS 3,080,515  3/1963  Kehoe _____ 322—2

FOREIGN PATENTS 648,937  8/1937  Germany.

DAVID X. SLINEY, Primary Examiner